(12) United States Patent
Wu et al.

(10) Patent No.: US 11,695,350 B2
(45) Date of Patent: Jul. 4, 2023

(54) CONTROL METHOD AND SYSTEM FOR THREE-PHASE GRID-CONNECTED INVERTER, AND THREE-PHASE GRID-CONNECTED INVERTER

(71) Applicant: ALTENERGY POWER SYSTEM INC., Zhejiang (CN)

(72) Inventors: Jian Wu, Zhejiang (CN); Biaojie Qi, Zhejiang (CN); Yongchun Yang, Zhejiang (CN); Yuhao Luo, Zhejiang (CN)

(73) Assignee: ALTENERGY POWER SYSTEM INC., Zhejiang (CN)

( * ) Notice: Subject to any disclaimer, the term of this patent is extended or adjusted under 35 U.S.C. 154(b) by 78 days.

(21) Appl. No.: 17/610,452

(22) PCT Filed: Feb. 17, 2020

(86) PCT No.: PCT/CN2020/075478
§ 371 (c)(1),
(2) Date: Nov. 11, 2021

(87) PCT Pub. No.: WO2021/142873
PCT Pub. Date: Jul. 22, 2021

(65) Prior Publication Data
US 2022/0255459 A1    Aug. 11, 2022

(30) Foreign Application Priority Data
Jan. 17, 2020  (CN) .......................... 202010052584.2

(51) Int. Cl.
*H02M 7/5387*  (2007.01)
*H02S 40/32*    (2014.01)
*H02M 1/12*    (2006.01)

(52) U.S. Cl.
CPC ......... *H02M 7/5387* (2013.01); *H02M 1/126* (2013.01); *H02S 40/32* (2014.12)

(58) Field of Classification Search
CPC ...... H02M 7/53; H02M 7/537; H02M 7/5387; H02M 1/12; H02M 1/126; H02S 40/30; H02S 40/32
See application file for complete search history.

(56) References Cited

U.S. PATENT DOCUMENTS

| | | | |
|---|---|---|---|
| 2016/0099659 A1 | 4/2016 | Chen et al. | |
| 2018/0262124 A1* | 9/2018 | Hsin | ..................... H02M 7/487 |

(Continued)

FOREIGN PATENT DOCUMENTS

| | | |
|---|---|---|
| CH | 715005 A2 | 11/2019 |
| CN | 203416162 U | 1/2014 |

(Continued)

OTHER PUBLICATIONS

International Search Report for PCT/CN2020/075478 dated Oct. 20, 2020, ISA/CN.

*Primary Examiner* — Adolf D Berhane
(74) *Attorney, Agent, or Firm* — Yue (Robert) Xu; Apex Attorneys at Law, LLP

(57) ABSTRACT

A three-phase grid-connected inverter, and a method and a device for controlling the three-phase grid-connected inverter are provided. The method is applied to a three-phase three-leg grid-connected inverter. A structure of the three-phase three-leg grid-connected inverter is improved, so that a filter capacitor (C1, C2, and C3) is connected to a negative electrode of a direct current input bus to form a harmonic bypass circuit. Inverter devices connected in parallel in the system operate stably without increase of inductance of an inductor (L1, L2, L3). In addition, the three-phase three-leg grid-connected inverter according to the present disclosure operates in a discontinuous mode of inductor current ($i_{L1}$, (Continued)

$i_{L2}$, and $i_{L3}$). That is, in the process that a power switch transistor ($Q_1$, $Q_2$, $Q_3$, $Q_4$, $Q_5$ and $Q_6$) on bridge legs is turned on, the inductor current ($i_{L1}$, $i_{L2}$, and $i_{L3}$) drops to zero.

14 Claims, 6 Drawing Sheets

(56) References Cited

U.S. PATENT DOCUMENTS

| | | |
|---|---|---|
| 2019/0252951 A1 | 8/2019 | Boulharts et al. |
| 2020/0091836 A1 | 3/2020 | Lee et al. |
| 2022/0255420 A1* | 8/2022 | Qi ............... H02M 7/5387 |

FOREIGN PATENT DOCUMENTS

| | | |
|---|---|---|
| CN | 110165967 A | 8/2019 |
| CN | 110168900 A | 8/2019 |
| CN | 110690830 A | 1/2020 |

* cited by examiner

CONTROL METHOD AND SYSTEM FOR THREE-PHASE GRID-CONNECTED INVERTER, AND THREE-PHASE GRID-CONNECTED INVERTER

The present application is a national phase application of PCT international patent application PCT/CN2020/075478, filed on Feb. 17, 2020 which claims priority to Chinese Patent Application No. 202010052584.2, titled "CONTROL METHOD AND SYSTEM FOR THREE-PHASE GRID-CONNECTED INVERTER, AND THREE-PHASE GRID-CONNECTED INVERTER", filed on Jan. 17, 2020, with the China National Intellectual Property Administration, all of which are incorporated herein by reference in their entireties.

FIELD

The present disclosure relates to the field of solar photovoltaic three-phase grid-connected systems, and in particular to a three-phase grid-connected inverter, and a method and a system for controlling the three-phase grid-connected inverter.

BACKGROUND

Three-phase three-leg grid-connected inverters are commonly used in a solar photovoltaic three-phase grid-connected system. Reference is made to FIG. 1, which is a schematic structural diagram of a three-phase three-leg grid-connected inverter according to the conventional technology. It can be seen from FIG. 1 that the three-phase three-leg grid-connected inverter has no harmonic bypass circuit, resulting in weak harmonic suppression. Especially, a waveform of a grid-connected current is weak under a low power. According to the conventional technology, in order to reduce a harmonic component in an output current of the three-phase three-leg grid-connected inverter, inductances of output inductors L1, L2 and L3 on the legs are commonly increased. However, with increase of the inductances, a risk of resonance of inverter devices connected in parallel with each other in the system is increased, which is not applicable to a photovoltaic micro-inverter. Moreover, the three-phase three-leg grid-connected inverter according to the conventional technology commonly operates in a continuous inductor current mode. That is, when a power switch transistor on a bridge leg is turned on, the inductor current never drops to zero, resulting in large switching loss of the power switch transistor, which affects conversion efficiency of the inverter.

Therefore, how to provide a solution to solve the above technical problems is a problem to be solved by those skilled in the art.

SUMMARY

A three-phase grid-connected inverter, and a method and a system for controlling the three-phase grid-connected inverter are provided according to the present disclosure, to improve the harmonic suppression and achieve a high-quality grid-connected current under low power. That is, the inverter devices connected in parallel with each other in the system can operate stably without increase of inductance, which is more applicable to the photovoltaic micro-inverter. In addition, the three-phase three-leg grid-connected inverter according to the present disclosure operates in a discontinuous inductor current mode, so as to reduce the switching loss of the power switch transistor and improve the conversion efficiency of the inverter.

In order to solve the above technical problems, a method for controlling a three-phase grid-connected inverter is provided according to the present disclosure. The method is applied to a three-phase three-leg grid-connected inverter including a filter capacitor. One terminal of the filter capacitor is connected to an output inductor of a corresponding bridge leg, and the other terminal of the filter capacitor is connected to a negative electrode of a direct current input bus. The method includes: dividing a power grid cycle into multiple intervals based on zero crossing points of fundamental waves of three inductor currents, where in each of the multiple intervals, two of the three inductor currents are in a positive direction and other inductor current is in a negative direction, or one of the three inductor currents is in a positive direction and other two inductor currents are in a negative direction, where a direction in which the inductor current flows from a bridge leg side to an alternating current side of a power grid is the positive direction, and a direction in which the inductor current flows from the alternating current side of the power grid to the bridge leg side is the negative direction; in an interval of the power grid cycle, controlling the three inductor currents in a discontinuous inductor current mode, so that fundamental components of the three inductor currents to be sine waves.

In an embodiment, the controlling the three inductor currents in a discontinuous inductor current mode, so that fundamental components of the three inductor currents to be sine wave includes: controlling, in the discontinuous inductor current mode, an inductor current in the positive direction and an inductor current in the negative direction alternately, to cause the fundamental components of the three inductor currents to be sine waves.

In an embodiment, the controlling the three inductor currents in a discontinuous inductor current mode, so that fundamental components of the three inductor currents to be sine wave includes: controlling, in the discontinuous inductor current mode, an inductor current in the positive direction and an inductor current in the negative direction in parallel, to cause the fundamental components of the three inductor currents to be sine waves.

In an embodiment, the controlling the three inductor currents in a discontinuous inductor current mode includes:

in order to control a target inductor current among the three inductor currents, controlling a target switch transistor corresponding to the target inductor current to be turned on;

acquiring a peak current corresponding to the target inductor current according to the following predetermined inductor peak current calculation expression:

$$\Delta I = \sqrt{\frac{2TI\sin\omega t \times (U_{dc} - U_x)U_x}{LU_{dc}}},$$

where $\Delta I$ represents a peak current, T represents an entire switching cycle in an interval, I represents an amplitude of an inductor current, $\omega$ represents an angular frequency of the inductor current, t represents time, L represents an inductance, $U_{dc}$ represents a voltage at a direct current side, and $U_x$ represents a voltage of a power grid node at an alternating current side relative to a negative electrode of a bus;

acquiring an actual current corresponding to the target inductor current, and controlling the target switch transistor to be turned off when the actual current reaches the peak current corresponding to the target inductor current; and controlling, after the target inductor current reaches zero and in the same manner, the target inductor current in a next switching cycle, to control the three inductor currents in the discontinuous inductor current mode.

In an embodiment, after the acquiring a peak current corresponding to the target inductor current and before the actual current reaches the peak current corresponding to the target inductor current, the method further includes: multiplying the peak current corresponding to the target inductor current by a positive coefficient α to obtain a product, as the peak current corresponding to the target inductor current.

In an embodiment, the controlling the three inductor currents in a discontinuous inductor current mode includes:

in order to control a target inductor current among the three inductor currents, controlling a target switch transistor corresponding to the target inductor current to be turned on;

acquiring a target on-duration ratio corresponding to the target inductor current in an entire switching cycle according to the following predetermined on-duration ratio calculation expression:

$$D = \sqrt{\frac{2LI\sin\omega t}{TU_{dc}(U_{dc} - U_x)}U_x},$$

acquiring target turn-on duration corresponding to the target inductor current in the entire switching cycle based on the target on-duration ratio, where T represents an entire switching cycle in an interval, D represents an on-duration ratio in the entire switching cycle, I represents an amplitude of an inductor current, ω represents an angular frequency of the inductor current, t represents time, L represents an inductance, $U_{dc}$ represents a voltage at a direct current side, and $U_x$ represents a voltage of a power grid node at an alternating current side relative to a negative electrode of a bus;

controlling the target switch transistor to be turned off when actual turn-on duration of the target switch transistor matches the target turn-on duration; and controlling, after the target inductor current reaches zero and in the same manner, the target inductor current in a next switching cycle, to control the three inductor currents in the discontinuous inductor current mode.

In an embodiment, after the acquiring a target on-duration ratio corresponding to the target inductor current in an entire switching cycle and before the acquiring target turn-on duration corresponding to the target inductor current in the entire switching cycle based on the target on-duration ratio, the method further includes: multiplying the target on-duration ratio by a positive coefficient α to obtain a product, as the target on-duration ratio corresponding to the target inductor current in the entire switching cycle.

In an embodiment, the method further includes: shifting phases of the three inductor currents based on power factor demand, to generate a phase difference between an inductor current and a power grid voltage in the power grid cycle.

To solve the above technical problems, a system for controlling a three-phase grid-connected inverter is further provided according to the present disclosure. The system is applied to a three-phase three-leg grid-connected inverter including a filter capacitor. One terminal of the filter capacitor is connected to an output inductor of a corresponding bridge leg, and the other terminal of the filter capacitor is connected to a negative electrode of a direct current input bus. The system includes a cycle dividing module and a current controlling module. The cycle dividing module is configured to divide a power grid cycle into multiple intervals based on zero crossing points of fundamental waves of three inductor currents. In each of the multiple intervals: two of the three inductor currents are in a positive direction, and other inductor current is in a negative direction; or one of the three inductor currents is in a positive direction, and other two inductor currents are in a negative direction. A direction in which the inductor current flows from a bridge leg side to an alternating current side of a power grid is the positive direction, and a direction in which the inductor current flows from the alternating current side of the power grid to the bridge leg side is the negative direction. The current controlling module is configured to control, in an interval of the power grid cycle, the three inductor currents in a discontinuous inductor current mode, so that fundamental components of the three inductor currents to be sine waves.

To solve the above technical problems, a three-phase grid-connected inverter is further provided according to the present disclosure. The three-phase grid-connected inverter includes six switch transistors, three output inductors and three filter capacitors. First terminals of a first switch transistor, a third switch transistor and a fifth switch transistor are all connected to a positive electrode of a direct current input bus. Second terminals of a second switch transistor, a fourth switch transistor and a sixth switch transistor are all connected to a negative electrode of the direct current input bus. A second terminal of the first switch transistor is connected to a first terminal of the second switch transistor, where a common terminal of the first switch transistor and the second switch transistor is connected to a first terminal of a first output inductor. A second terminal of the third switch transistor is connected to a first terminal of the fourth switch transistor, where a common terminal of the third switch transistor and the fourth switch transistor is connected to a first terminal of a second output inductor. A second terminal of the fifth switch transistor is connected to a first terminal of the sixth switch transistor, where a common terminal of the fifth switch transistor and the sixth switch transistor is connected to a first terminal of a third output inductor. A second terminal of the first output inductor is connected to a first terminal of a first filter capacitor, where a common terminal of the first output inductor and the first filter capacitor is connected to an A phase line of a power grid. A second terminal of the second output inductor is connected to a first terminal of a second filter capacitor, where a common terminal of the second output inductor and the second filter capacitor is connected to a B phase line of the power grid. A second terminal of the third output inductor is connected to a first terminal of a third filter capacitor, where a common terminal of the third output inductor and the third filter capacitor is connected to a C phase line of the power grid. Second terminals of the first filter capacitor, the second filter capacitor, and the third filter capacitor are connected to the negative electrode of the direct current input bus. The three-phase grid-connected inverter is controlled by the above method for controlling a three-phase grid-connected inverter.

A method for controlling a three-phase grid-connected inverter is provided according to the present disclosure. The method is applied to a three-phase three-leg grid-connected inverter. The structure of the three-phase three-leg grid-connected inverter is improved in the present disclosure, so that the filter capacitor is connected to the negative electrode of the direct current input bus to form a harmonic bypass circuit, thereby improving harmonic suppression and generate a high-quality grid-connected current at low power. That is, inverter devices connected in parallel with each other in the system operate stably without increase of inductance, which is more applicable to a photovoltaic micro-inverter. In addition, the three-phase three-leg grid-connected inverter according to the present disclosure operates in the discontinuous inductor current mode. That is, in the process that the power switch transistor on the bridge leg is turned on, the inductor current drops to zero, thereby reducing the switching loss of the power switch transistor and improving the conversion efficiency of the inverter.

A system for controlling a three-phase grid-connected inverter and a three-phase grid-connected inverter are further provided according to the present disclosure, and have the same beneficial effect as the method described above.

BRIEF DESCRIPTION OF THE DRAWINGS

In order to more clearly illustrate technical solutions in embodiments of the present disclosure, the drawings to be used in the embodiments or the conventional technology are briefly described below. Apparently, the drawings in the following description show only some embodiments of the present disclosure, and other drawings may be obtained by those skilled in the art from the drawings without any creative work.

FIG. 5 (*b*) is a schematic diagram showing a waveform of the inductor current in the interval 1 in the power grid cycle according to another embodiment of the present disclosure;

DETAILED DESCRIPTION OF THE EMBODIMENTS

A three-phase grid-connected inverter, and a method and a system for controlling the three-phase grid-connected inverter are provided according to the present disclosure, to improve harmonic suppression and achieve a high-quality grid-connected current under low power. That is, inverter devices connected in parallel with each other in the system operate stably without increase of inductance, which is more applicable to a photovoltaic micro-inverter. In addition, the three-phase three-leg grid-connected inverter according to the present disclosure operates in a discontinuous inductor current mode, thereby reducing the switching loss of the power switch transistors and improving the conversion efficiency of the inverter.

In order to make objects, technical solutions and advantages of the present disclosure clearer, the technical solutions in the embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

Figure 1:
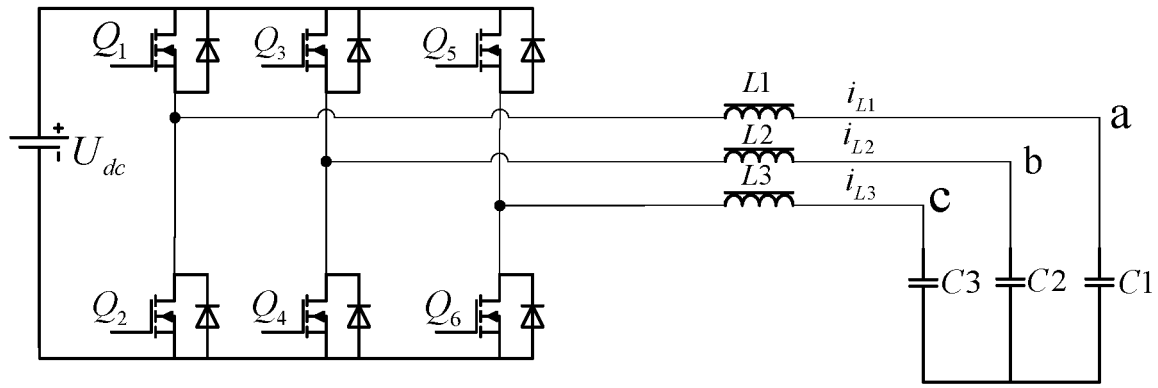
FIG. 1 is a schematic structural diagram of a three-phase three-leg grid-connected inverter according to the conventional technology.
Figure 2:
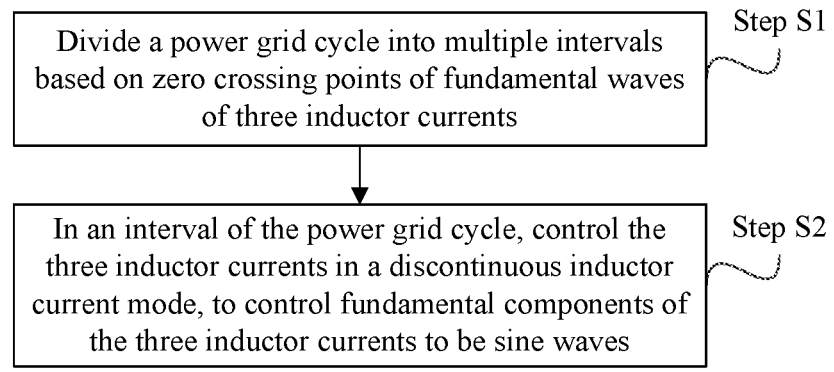
FIG. 2 is a flow chart of a method for controlling a three-phase grid-connected inverter according to an embodiment of the present disclosure.

Reference is made to FIG. 2, which is a flow chart of a method for controlling a three-phase grid-connected inverter according to an embodiment of the present disclosure.

The method for controlling a three-phase grid-connected inverter is applied to a three-phase three-leg grid-connected inverter including a filter capacitor. One terminal of the filter capacitor is connected to an output inductor of a corresponding bridge leg, and the other terminal of the filter capacitor is connected to a negative electrode of a direct current input bus. The method includes the following steps S1 and S2.

In step S1, a power grid cycle is divided into multiple intervals based on zero crossing points of fundamental waves of three inductor currents.

Figure 3:
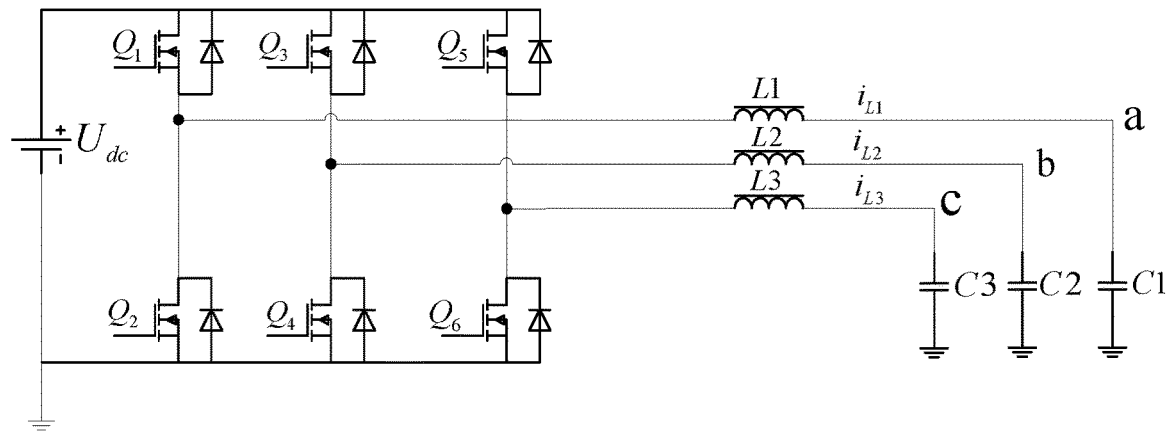
FIG. 3 is a schematic structural diagram of a three-phase three-leg grid-connected inverter according to an embodiment of the present disclosure.

A structure of the three-phase three-leg grid-connected inverter according to the present disclosure is described as follows. A structure of the three-phase three-leg grid-connected inverter according to the conventional technology is improved (where reference is made to FIG. 3, which is a schematic structural diagram of a three-phase three-leg grid-connected inverter according to an embodiment of the present disclosure) in the present disclosure. In FIG. 3, a first switch transistor Q1 and a second switch transistor Q2 form a first bridge leg of the three-phase three-leg grid-connected inverter. A third switch transistor Q3 and a fourth switch transistor Q4 form a second bridge leg of the three-phase three-leg grid-connected inverter. A fifth switch transistor Q5 and a sixth switch transistor Q6 form a third bridge leg of the three-phase three-leg grid-connected inverter. For each of the three bridge legs, a midpoint of the bridge leg is connected in series with an output inductor and a filter capacitor. For each of three filter capacitors C1, C2 and C3, one terminal of the filter capacitor is connected to the output inductor on the bridge leg corresponding to the filter capacitor, and the other terminal of the filter capacitor is connected to a negative electrode of a direct current input bus (by grounding the negative electrode of the direct current input bus and the other terminal of the filter capacitor), to form a harmonic bypass circuit, thereby improving harmonic suppression and generate a high-quality grid-connected current at low power. That is, the inverter devices connected in parallel with each other in the system operate stably without increase of inductance, which is more applicable to the photovoltaic micro-inverter.

Figure 4:
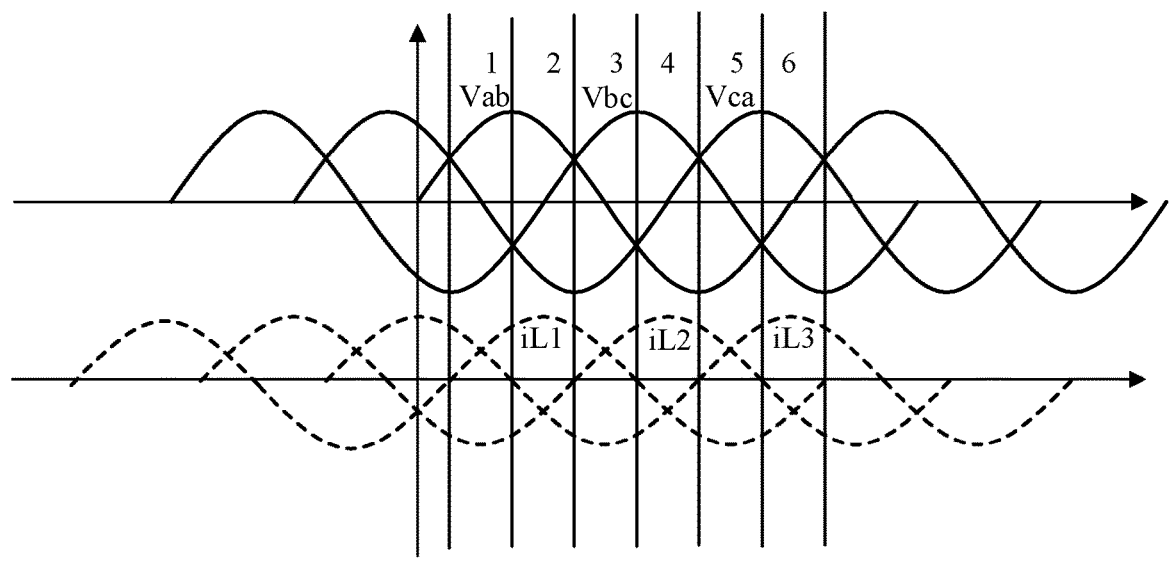
FIG. 4 is a schematic diagram showing division of a power grid cycle according to an embodiment of the present disclosure.

Based on this, the power grid cycle is divided into multiple intervals based on zero crossing points of fundamental waves of the three inductor currents according to the present disclosure, as shown in FIG. 4. In each of the multiple intervals, two of the three inductor currents are in a positive direction, and other inductor current is in a negative direction. Alternatively, one of the three inductor currents is in a positive direction, and other two inductor currents are in a negative direction. A direction in which the inductor current flows from a bridge leg side to an alternating current side of the power grid is the positive direction, and a direction in which the inductor current flows from the alternating current side of the power grid to the bridge leg side is the negative direction.

In step S2, in an interval of the power grid cycle, the three inductor currents are controlled in a discontinuous inductor current mode, so that fundamental components of the three inductor currents are all sine waves.

It can be seen from step S1 that the power grid cycle is divided into six intervals based on the zero crossing points of three inductor currents. In each of the six intervals, the three inductor currents are controlled. The following table 1 shows directions of the controlled inductor currents corresponding to each interval. Table 2 shows switch transistors in operation corresponding to the controlled inductor currents in each interval.

TABLE 1

| Interval | 1 | 2 | 3 | 4 | 5 | 6 |
|---|---|---|---|---|---|---|
| Current fundamental wave in a positive direction | $i_{L1}, i_{L3}$ | $i_{L1}$ | $i_{L1}, i_{L2}$ | $i_{L2}$ | $i_{L2}, i_{L3}$ | $i_{L3}$ |
| Current fundamental wave in a negative direction | $i_{L2}$ | $i_{L2}, i_{L3}$ | $i_{L3}$ | $i_{L1}, i_{L3}$ | $i_{L1}$ | $i_{L1}, i_{L2}$ |

TABLE 2

| Interval | 1 | 2 | 3 | 4 | 5 | 6 |
|---|---|---|---|---|---|---|
| Switch transistor | Q1 Q5 Q4 | Q1 Q4 Q6 | Q1 Q3 Q6 | Q3 Q2 Q6 | Q3 Q5 Q2 | Q5 Q2 Q4 |

The output inductor according to the present disclosure operates in a discontinuous mode (that is, in a process that the power switch transistor on the bridge leg is turned on, the inductor current drops to zero). Therefore, in order to ensure completion of inductor current of each phase, the inductor current of one phase is controlled after the inductor current of the other phase reaches zero, so that the fundamental components of the three inductor currents are all sine waves, thereby reducing the switching loss of the power switch transistor and improving the conversion efficiency of the inverter.

The method for controlling a three-phase grid-connected inverter is provided according to the present disclosure. The method is applied to a three-phase three-leg grid-connected inverter. The structure of the three-phase three-leg grid-connected inverter is improved in the present disclosure, so that the filter capacitor is connected to the negative electrode of the direct current input bus to form the harmonic bypass circuit, thereby improving harmonic suppression and generate a high-quality grid-connected current at low power. That is, the inverter devices connected in parallel with each other in the system operate stably without increase of inductance, which is more applicable to the photovoltaic micro-inverter. In addition, the three-phase three-leg grid-connected inverter according to the present disclosure operates in the discontinuous inductor current mode. That is, in the process that the power switch transistor on the bridge leg is turned on, the inductor current drops to zero, thereby reducing the switching loss of the power switch transistor and improving the conversion efficiency of the inverter.

Based on the above embodiment, in an alternative embodiment, the process of controlling the three inductor currents in the discontinuous inductor current mode, so that fundamental components of the three inductor currents are all sine waves includes: controlling, in the discontinuous inductor current mode, the inductor current in the positive direction and the inductor current in the negative direction alternately, so that the fundamental components of the three inductor currents are all sine waves.

Figure 5:
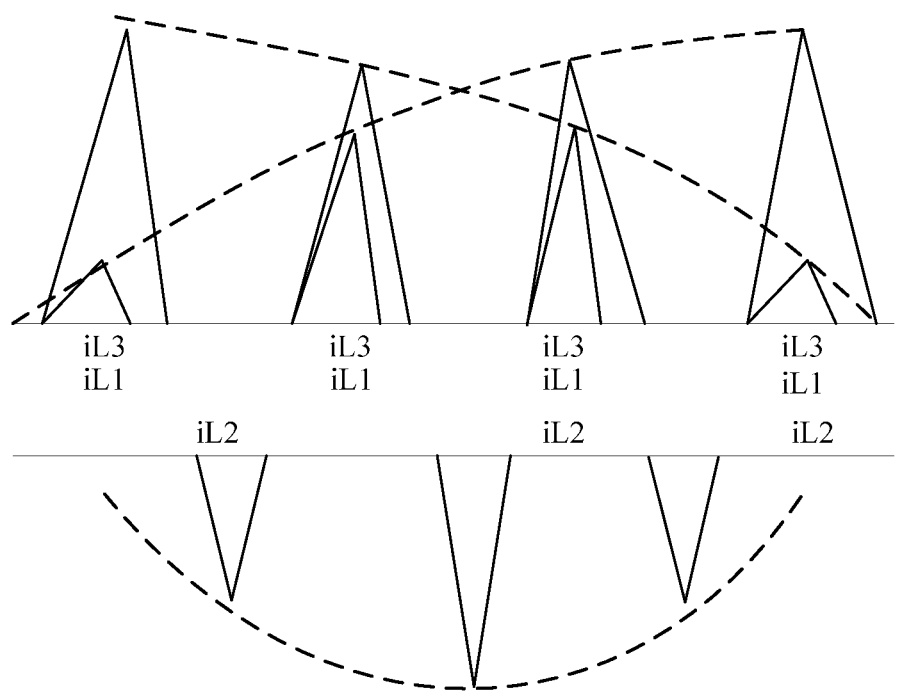
FIG. 5 (*a*) is a schematic diagram showing a waveform of an inductor current in an interval 1 in the power grid cycle according to an embodiment of the present disclosure.
Figure 5:
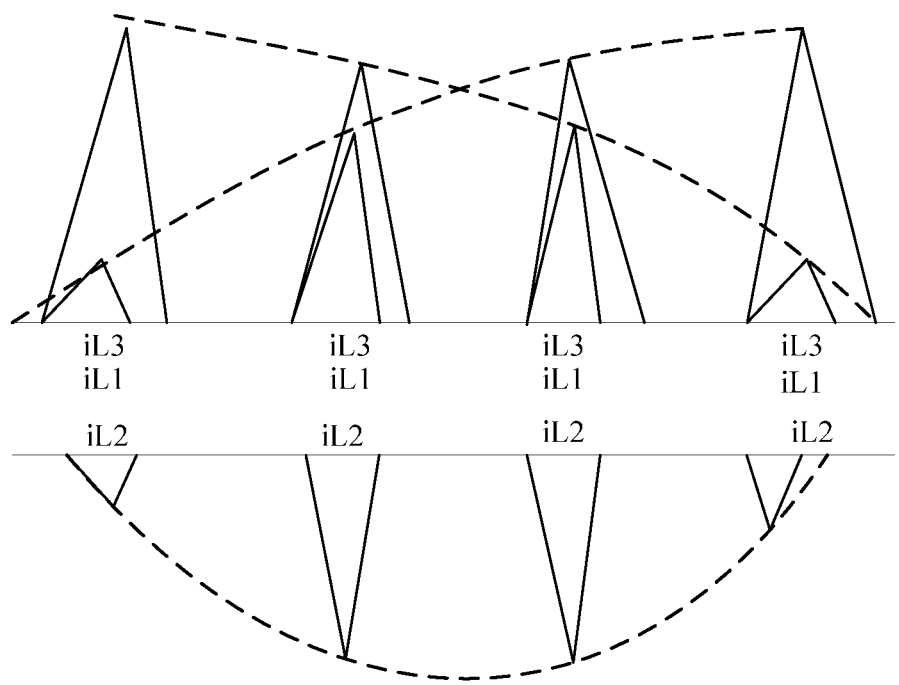

For example, in the interval 1, waveforms of the three inductor currents are shown in FIG. 5(a). A sequence of the controlled inductor currents is $i_{L1}$, $i_{L3} \rightarrow i_{L2} \rightarrow i_{L1}$, $i_{L3} \rightarrow i_{L2}$ . . . (where a dotted line in the drawings represents a fundamental component of the inductor current). That is, the inductor current in the positive direction and the inductor current in the negative direction are alternately controlled.

In an alternative embodiment, the process of controlling the three inductor currents in a discontinuous inductor current mode, so that fundamental components of the three inductor currents are all sine wave includes: controlling, in the discontinuous inductor current mode, the inductor current in the positive direction and the inductor current in the negative direction in parallel, so that the fundamental components of the three inductor currents are all sine waves.

For example, in the interval 1, waveforms of the three inductor currents are shown in FIG. 5(b). A sequence of the controlled inductor currents is $i_{L1}$, $i_{L2}$, $i_{L3} \rightarrow i_{L1}$, $i_{L2}$, $i_{L3}$ . . . (where a dotted line in the drawings represents a fundamental component of the inductor current). That is, the inductor current in the positive direction and the inductor current in the negative direction are controlled in parallel.

In an alternative embodiment, the process of controlling the three inductor currents in the discontinuous inductor current mode includes:

in order to control a target inductor current among the three inductor currents, controlling a target switch transistor corresponding to the target inductor current to be turned on;

acquiring a peak current corresponding to the target inductor current according to the following predetermined inductor peak current calculation expression:

$$\Delta I = \sqrt{\frac{2TI\sin\omega t \times (U_{dc} - U_x)U_x}{LU_{dc}}}$$

where $\Delta I$ represents a peak current, T represents an entire switching cycle in an interval, I represents an amplitude of an inductor current, $\omega$ represents an angular frequency of the inductor current, t represents time, L represents an inductance, $U_{dc}$ represents a voltage at a direct current side, and $U_x$ represents a voltage of a power grid node at an alternating current side relative to a negative electrode of a bus;

acquiring an actual current corresponding to the target inductor current, and controlling the target switch transistor to be turned off when the actual current reaches the peak current; and after the target inductor current reaches zero, controlling, in the same manner, the target inductor current in a next switching cycle, so that the three inductor currents are controlled in the discontinuous inductor current mode.

In the embodiment of the present disclosure, the inductor current is in the discontinuous mode, and a waveform of the output current is a sine wave. Therefore, the peak current corresponding to the inductor current is calculated, and the switch transistor is controlled with the peak current as a reference based on analog control, to generate a required inductor current.

Figure 6:
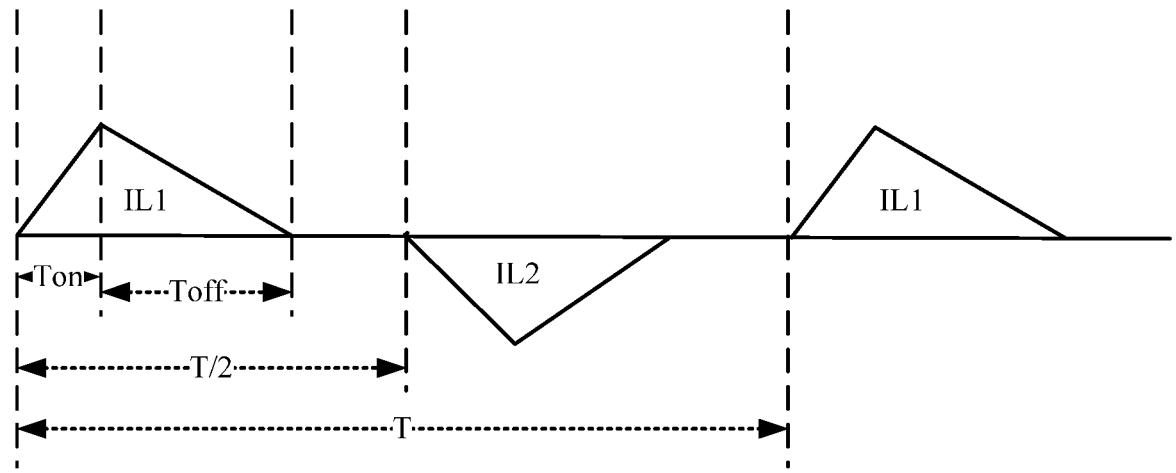
FIG. 6 is a schematic diagram showing control of an inductor current in the interval 1 in the power grid cycle according to an embodiment of the present disclosure.

Reference is made to FIG. 6, which is a schematic diagram showing control of an inductor current in the interval 1 in the power grid cycle according to an embodiment of the present disclosure. Ton represents turn-on duration, Toff represents turn-off duration, T represents an entire switching cycle in the interval, D represents an on-duration ratio, Dp represents an off-duration ratio, $U_{dc}$ represents a voltage at a direct current side, $U_x$ represents a voltage of a power grid node at an alternating current side relative to a negative electrode of a bus, ΔI represents a peak current, and L represents an inductance.

$$Ton = D \times T = \frac{L\Delta I}{U_{dc} - U_x}; \quad (1)$$

$$Toff = Dp \times T = \frac{L\Delta I}{U_x}; \quad (2)$$

ΔI represents the peak current corresponding to the inductor current in each switching cycle, a mean of the inductor current in each switching cycle is calculated according to the following expression:

$$\frac{\Delta I \times (Ton + Toff)}{2T} \quad (3)$$

where $\frac{\Delta I \times (Ton + Toff)}{2T} = I\sin\omega t$

Expressions (1) and (2) are substituted into the expression (3), to obtain the following expression (4).

$$\frac{\Delta I^2 \times L}{2T} \frac{U_{dc}}{(U_{dc} - U_x)U_x} = I\sin\omega t \quad (4)$$

Therefore, the inductor peak current calculation expression is expressed as:

$$\Delta I = \sqrt{\frac{2TI\sin\omega t \times (U_{dc} - U_x)U_x}{LU_{dc}}}. \quad (5)$$

Based on this, in order to control the target inductor current (for example, $i_{L1}$, $i_{L3}$ or $i_{L2}$), the target switch transistor corresponding to the target inductor current is controlled to be turned on (for example, in order to control the inductor current $i_{L1}$ in the interval 1, the first switch transistor Q1 is controlled to be turned on). The peak current corresponding to the target inductor current is acquired according to the inductor peak current calculation expression:

$$\Delta I = \sqrt{\frac{2TI\sin\omega t \times (U_{dc} - U_x)U_x}{LU_{dc}}}.$$

The actual current of the target inductor current is acquired. When the actual current reaches the peak current corresponding to the target inductor current, the target switch transistor is controlled to be turned off (for example, in order to control the inductor current $i_{L1}$ in the interval 1, an actual current flowing through a first output inductor L1 is acquired, and the first switch transistor Q1 is controlled to be turned off when the actual current reaches a peak current corresponding to the inductor current $i_{L1}$). When the target inductor current in this switching cycle reaches zero, the target inductor current is controlled in the same manner in a next switching cycle. The control process is repeated to the end of the current interval, to achieve the control of the inductor currents in the discontinuous inductor current mode in the current interval.

Figure 7:
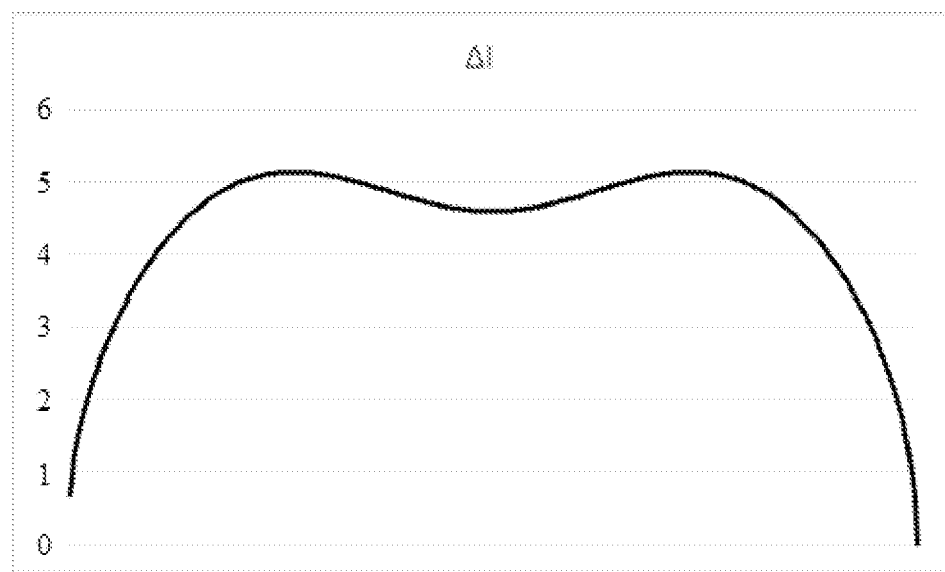
FIG. 7 is a schematic diagram showing a waveform of a peak current of an inductor current of a phase in half the power grid cycle according to an embodiment of the present disclosure.

Reference is made to FIG. 7, which is a schematic diagram showing a waveform of a peak current of an inductor current of a phase in half the power grid cycle according to an embodiment of the present disclosure.

In an alternative embodiment, after the acquiring a peak current corresponding to the target inductor current, and before the actual current reaches the peak current corresponding to the target inductor current, the method further includes: multiplying the peak current corresponding to the target inductor current by a positive coefficient α to obtain a product, as the peak current corresponding to the target inductor current.

The embodiment is not described in detail here and is described together with the subsequent embodiments.

In an alternative embodiment, the process of controlling the three inductor currents in the discontinuous inductor current mode includes:

in order to control a target inductor current among the three inductor currents, controlling a target switch transistor corresponding to the target inductor current to be turned on;

acquiring a target on-duration ratio corresponding to the target inductor current in the entire switching cycle according to the following predetermined on-duration ratio calculation expression:

$$D = \sqrt{\frac{2LI\sin\omega t}{TU_{dc}(U_{dc} - U_x)} U_x},$$

acquiring target turn-on duration corresponding to the target inductor current in the entire switching cycle based on the target on-duration ratio, where T represents an entire switching cycle in an interval, D represents an on-duration ratio in the entire switching cycle, I represents an amplitude of an inductor current, ω represents an angular frequency of the inductor current, t represents time, L represents an inductance, $U_{dc}$ represents a voltage at a direct current side, and $U_x$ represents a voltage of a power grid node at an alternating current side relative to an negative electrode of a bus;

controlling the target switch transistor to be turned off when actual turn-on duration of the target switch transistor matches the target turn-on duration; and after the target inductor current reaches zero, controlling, in the same manner, the target inductor current in a next switching cycle, so that the three inductor currents are controlled in the discontinuous inductor current mode.

In the present disclosure, a duty cycle is calculated to perform digital control. The switch transistor is directly controlled based on the duty cycle, so as to generate the required inductor current.

From the expressions (1) and (2), the following expressions (6) to (9) are obtained.

$$\frac{D}{Dp} = \frac{U_x}{U_{dc} - U_x}; \quad (6)$$

-continued $$Dp = D\frac{(U_{dc} - U_x)}{U_x}; \quad (7)$$

$$D + Dp = D\frac{U_{dc}}{U_x}; \quad (8)$$

$$Ton + Toff = (D + Dp)T = D\frac{U_{dc}}{U_x}T. \quad (9)$$

By setting an expression $$\frac{\Delta I \times (Ton + Toff)}{2T} = I\sin\omega t,$$

and substituting the expressions (1) and (9) into the equation (3), the following equation (11) is obtained.

$$\frac{\Delta I^2 \times L}{2T} \frac{U_{dc}}{(U_{dc} - U_x)U_x} = I\sin\omega t. \quad (11)$$

Therefore, the on-duration ratio calculation expression is represent as:

$$D = \sqrt{\frac{2LI\sin\omega t}{TU_{dc}(U_{dc} - U_x)}U_x} \quad (12)$$

Based on this, in order to control the target inductor current among the three inductor currents, a target switch transistor corresponding to the target inductor current is controlled to be turned on. A target on-duration ratio corresponding to the target inductor current in the entire switching cycle is acquired according to the following on-duration ratio calculation expression:

$$D = \sqrt{\frac{2LI\sin\omega t}{TU_{dc}(U_{dc} - U_x)}U_x}.$$

Target turn-on duration Ton=D*T corresponding to the target inductor current in the entire switching cycle is acquired based on the target on-duration ratio. How long the target switch transistor is turned on is timed from a time instant when the target switch transistor is turned on. When actual turn-on duration (that is, timed duration) of the target on-duration ratio matches the target turn-on duration, the target switch transistor is controlled to be turned off. When the target inductor current in this switching cycle reaches zero, the target inductor current is controlled in the same manner in a next switching cycle. The control process is repeated to the end of a current interval, to achieve the control of the inductor currents in the discontinuous inductor current mode in the current interval.

Figure 8:
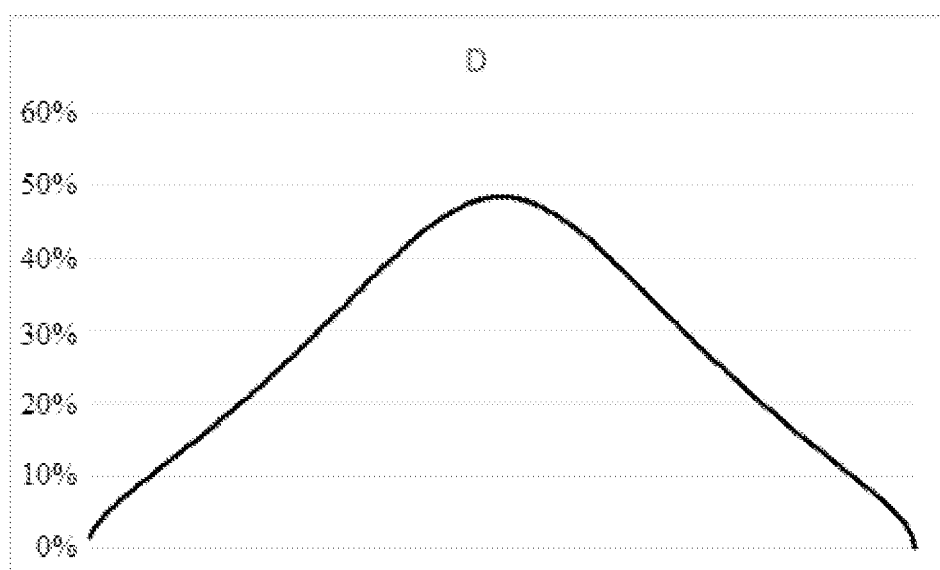
FIG. 8 is a schematic diagram showing a waveform of a duty cycle of a phase in half the power grid cycle according to an embodiment of the present disclosure.

Reference is made to FIG. 8, which is a schematic diagram showing a waveform of a duty cycle of a phase in half the power grid cycle according to an embodiment of the present disclosure.

In an alternative embodiment, after the acquiring a target on-duration ratio corresponding to the target inductor current in the entire switching cycle and before the acquiring target turn-on duration corresponding to the target inductor current in the entire switching cycle based on the target on-duration ratio, the method further includes: multiplying the target on-duration ratio by a positive coefficient α to obtain a product, as the target on-duration ratio corresponding to the target inductor current in the entire switching cycle.

Furthermore, it can be seen from the expression (4) that with reduction of T, utilization of the inductor current is improved. That is, in a case of the same ΔI, I is increased with the reduction of T. Further, in order to reduce a ripple of the output current, T is required to be as small as possible. Since the three-phase three-leg grid-connected inverter according to the present disclosure operates in the discontinuous inductor current mode, that is, Ton+Toff<T, and T is close to Ton+Toff T varies with I, that is, constant frequency control is adopted under the same power and variable frequency control is adopted under different powers.

Variation coefficients of I and T are determined to be a, and thus the following expressions (13) to (15) are obtained.

$$\Delta I' = \sqrt{\frac{2\alpha T \times \alpha I\sin\omega t}{L} \frac{(U_{dc} - U_x)U_x}{U_{dc}}}; \quad (13)$$

$$\Delta I' = \alpha\sqrt{\frac{2T \times I\sin\omega t}{L} \frac{(U_{dc} - U_x)U_x}{U_{dc}}}; \quad (14)$$

$$D' = \alpha\sqrt{\frac{2L \times I\sin\omega t}{T} \frac{U_x}{U_{dc}(U_{dc} - U_x)}}. \quad (15)$$

I and T are changed by adjusting the variation coefficient α, so that output power of the inverter is controlled.

In addition, in a case of Ton+Toff=T, the inverter is in a critical continuous mode. The following expression (6) is acquired from the expression (3).

$$\Delta I = 2I\sin\omega t \quad (16)$$

In the case that the inverter is in a critical continuous mode, the variable frequency control is adopted under the same power. The following expression (17) is acquired form expressions (1) and (2).

$$T = \frac{2LU_{dc}I\sin\omega t}{(U_{dc} - U_x)U_x} \quad (17)$$

The expression (17) is substituted into the expression (12), to obtain the following expression (18).

$$D = \frac{U_x}{U_{dc}} \quad (18)$$

In an alternative embodiment, the method further includes: shifting phases of the three inductor currents based on power factor demand, to generate a phase difference between the inductor current and a power grid voltage in the power grid cycle.

Furthermore, a phase of the inductor current is not related to a phase of the power grid voltage. Therefore, as long as the phases of the three inductor currents are shifted, the phase difference between the inductor current and the power grid voltage varies, so that the phase of the inductor current lead or lag the phase of the grid voltage, thereby controlling the power factor of the inverter to change from −1 to +1. Based on this, the phases of the three inductor currents are shifted according to the present disclosure, to meet a current power factor demand.

A system for controlling a three-phase grid-connected inverter is further provided according to embodiments of the present disclosure. The system is applied to a three-phase three-leg grid-connected inverter including a filter capacitor. One terminal of the filter capacitor is connected to an output inductor of a corresponding bridge leg, and the other terminal of the filter capacitor is connected to a negative electrode of a direct current input bus. The system includes a switching cycle dividing module and a current controlling module.

The switching cycle dividing module is configured to divide a power grid cycle into multiple intervals based on zero crossing points of fundamental waves of three inductor currents. Two of the three inductor currents are in a positive direction, and other inductor current is in a negative direction. Alternatively, one of the three inductor currents is in the positive direction, and other two inductor currents are in a negative direction. The inductor current flowing from a bridge leg side to an alternating current side of a power grid is defined as the positive direction, and the inductor current flowing from the alternating current side of the power grid to the bridge leg side is defined as the negative direction.

The current controlling module is configured to control, in an interval of the power grid cycle, the three inductor currents in a discontinuous inductor current mode, so that fundamental components of the three inductor currents are all sine waves.

For the system in the present disclosure, reference is made to the embodiments of the above-mentioned method. Therefore, the system is not described in detail herein.

A three-phase grid-connected inverter is further provided according to the present disclosure. The three-phase grid-connected inverter includes six switch transistors, three output inductors and three filter capacitors First terminals of a first switch transistor, a third switch transistor and a fifth switch transistor are all connected to a positive electrode of a direct current input bus. Second terminals of a second switch transistor, a fourth switch transistor and a sixth switch transistor are all connected to a negative electrode of the direct current input bus. A second terminal of the first switch transistor is connected to a first terminal of the second switch transistor, and a common terminal of the first switch transistor and the second switch transistor is connected to a first terminal of a first output inductor. A second terminal of the third switch transistor is connected to a first terminal of the fourth switch transistor, and a common terminal of the third switch transistor and the fourth switch transistor is connected to a first terminal of a second output inductor. A second terminal of the fifth switch transistor is connected to a first terminal of the sixth switch transistor, and a common terminal of the fifth switch transistor and the sixth switch transistor is connected to a first terminal of a third output inductor. A second terminal of the first output inductor is connected to a first terminal of a first filter capacitor, and a common terminal of the first output inductor and the first filter capacitor is connected to an A phase line of a power grid. A second terminal of the second output inductor is connected to a first terminal of a second filter capacitor, and a common terminal of the second output inductor and the second filter capacitor is connected to a B phase line of the power grid. A second terminal of the third output inductor is connected to a first terminal of a third filter capacitor, and a common terminal of the third output inductor and the third filter capacitor is connected to a C phase line of the power grid. Second terminals of the first filter capacitor, the second filter capacitor, and the third filter capacitor are connected to the negative electrode of the direct current input bus.

The three-phase grid-connected inverter is controlled by the method for controlling a three-phase grid-connected inverter according to any one of the above embodiments.

For the three-phase grid-connected inverter (as shown in FIG. 3) according to the present disclosure, reference is made to the embodiments of the above-mentioned method. Therefore, the three-phase grid-connected inverter is not described in detail herein.

It should further be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof intended to be non-exclusive. Therefore, a process, method, article or device including a series of elements include not only the disclosed elements but also other elements that are not clearly enumerated, or further include elements inherent for the process, method, article or device. Unless expressively limited, the statement "including a . . . " does not exclude the case that other similar elements may exist in the process, method, article or device.

The disclosed embodiments are described above, so that those skilled in the art can implement or use the present disclosure. Various modifications to these embodiments are apparent to those skilled in the art, and the general principle defined herein may be implemented in other embodiments without deviating from the spirit or scope of the present disclosure. Therefore, the present disclosure is not limited to these embodiments described herein, but in accordance with the widest scope consistent with the principle and novel features disclosed herein.

The invention claimed is:

1. A method for controlling a three-phase grid-connected inverter, wherein
   the method is applied to a three-phase three-leg grid-connected inverter comprising a filter capacitor, wherein one terminal of the filter capacitor is connected to an output inductor of a corresponding bridge leg, and the other terminal of the filter capacitor is connected to a negative electrode of a direct current input bus; and
   the method comprises:
   dividing a power grid cycle into a plurality of intervals based on zero crossing points of fundamental waves of three inductor currents, wherein in each of the plurality of intervals:
      two of the three inductor currents are in a positive direction, and other inductor current is in a negative direction, or
      one of the three inductor currents is in a positive direction, and other two inductor currents are in a negative direction, wherein a direction in which the inductor current flows from a bridge leg side to an alternating current side of a power grid is the positive direction, and a direction in which the inductor current flows from the alternating current side of the power grid to the bridge leg side is the negative direction; and
   controlling, in an interval of the power grid cycle, the three inductor currents in a discontinuous inductor current mode, to cause fundamental components of the three inductor currents to be sine waves.

2. The method for controlling a three-phase grid-connected inverter according to claim 1, wherein the controlling the three inductor currents in a discontinuous inductor current mode, to cause fundamental components of the three inductor currents to be sine wave comprises:

controlling, in the discontinuous inductor current mode, an inductor current in the positive direction and an inductor current in the negative direction alternately, to cause the fundamental components of the three inductor currents to be sine waves.

3. The method for controlling a three-phase grid-connected inverter according to claim 1, wherein the controlling the three inductor currents in a discontinuous inductor current mode, to cause fundamental components of the three inductor currents to be sine wave comprises:

controlling, in the discontinuous inductor current mode, an inductor current in the positive direction and an inductor current in the negative direction in parallel, to cause the fundamental components of the three inductor currents to be sine waves.

4. The method for controlling a three-phase grid-connected inverter according to claim 2, wherein the controlling the three inductor currents in a discontinuous inductor current mode comprises:

in order to control a target inductor current among the three inductor currents, controlling a target switch transistor corresponding to the target inductor current to be turned on;

acquiring a peak current corresponding to the target inductor current according to the following predetermined inductor peak current calculation expression:

$$\Delta I = \sqrt{\frac{2TI\sin\omega t \times (U_{dc} - U_x)U_x}{LU_{dc}}},$$

wherein $\Delta I$ represents a peak current, T represents an entire switching cycle in an interval, I represents an amplitude of an inductor current, $\omega$ represents an angular frequency of the inductor current, t represents time, L represents an inductance, $U_{dc}$ represents a voltage at a direct current side, and $U_x$ represents a voltage of a power grid node at an alternating current side relative to a negative electrode of a bus;

acquiring an actual current corresponding to the target inductor current, and controlling the target switch transistor to be turned off when the actual current reaches the peak current corresponding to the target inductor current; and controlling, after the target inductor current reaches zero and in the same manner, the target inductor current in a next switching cycle, to control the three inductor currents in the discontinuous inductor current mode.

5. The method for controlling a three-phase grid-connected inverter according to claim 4, wherein after the acquiring a peak current corresponding to the target inductor current and before the actual current reaches the peak current corresponding to the target inductor current, the method further comprises:

multiplying the peak current corresponding to the target inductor current by a positive coefficient $\alpha$ to obtain a product, as the peak current corresponding to the target inductor current.

6. The method for controlling a three-phase grid-connected inverter according claim 2, wherein the controlling the three inductor currents in a discontinuous inductor current mode comprises:

in order to control a target inductor current among the three inductor currents, controlling a target switch transistor corresponding to the target inductor current to be turned on;

acquiring a target on-duration ratio corresponding to the target inductor current in an entire switching cycle according to the following predetermined on-duration ratio calculation expression:

$$D = \sqrt{\frac{2LI\sin\omega t}{TU_{dc}(U_{dc} - U_x)}U_x},$$

and acquiring target turn-on duration corresponding to the target inductor current in the entire switching cycle based on the target on-duration ratio, wherein T represents an entire switching cycle in an interval, D represents an on-duration ratio in the entire switching cycle, I represents an amplitude of an inductor current, $\omega$ represents an angular frequency of the inductor current, t represents time, L represents an inductance, $U_{dc}$ represents a voltage at a direct current side, and $U_x$ represents a voltage of a power grid node at an alternating current side relative to a negative electrode of a bus;

controlling the target switch transistor to be turned off when actual turn-on duration of the target switch transistor matches the target turn-on duration; and controlling, after the target inductor current reaches zero and in the same manner, the target inductor current in a next switching cycle, to control the three inductor currents in the discontinuous inductor current mode.

7. The method for controlling a three-phase grid-connected inverter according to claim 6, wherein after the acquiring a target on-duration ratio corresponding to the target inductor current in an entire switching cycle and before the acquiring target turn-on duration corresponding to the target inductor current in the entire switching cycle based on the target on-duration ratio, the method further comprises:

multiplying the target on-duration ratio by a positive coefficient $\alpha$ to obtain a product, as the target on-duration ratio corresponding to the target inductor current in the entire switching cycle.

8. The method for controlling a three-phase grid-connected inverter according to claim 1, further comprising:

shifting phases of the three inductor currents based on power factor demand, to generate a phase difference between an inductor current and a power grid voltage in the power grid cycle.

9. A system for controlling a three-phase grid-connected inverter, wherein the system is applied to a three-phase three-leg grid-connected inverter comprising a filter capacitor, wherein one terminal of the filter capacitor is connected to an output inductor of a corresponding bridge leg, and the other terminal of the filter capacitor is connected to a negative electrode of a direct current input bus; and the system comprises:

a cycle dividing module configured to divide a power grid cycle into a plurality of intervals based on zero crossing points of fundamental waves of three inductor currents, wherein in each of the plurality of intervals:

two of the three inductor currents are in a positive direction, and other inductor current is in a negative direction, or one of the three inductor currents is in a positive direction, and other two inductor currents are in a negative direction, wherein a direction in which the inductor current flows from a bridge leg side to an alternating current side of a power grid is the positive direction, and a direction in which the inductor current flows from the alternating current side of the power grid to the bridge leg side is the negative direction; and a current controlling module configured to control, in an interval of the power grid cycle, the three inductor currents in a discontinuous inductor current mode, so that fundamental components of the three inductor currents to be sine waves.

10. A three-phase grid-connected inverter, comprising: six switch transistors, three output inductors and three filter capacitors, wherein first terminals of a first switch transistor, a third switch transistor and a fifth switch transistor are all connected to a positive electrode of a direct current input bus;

second terminals of a second switch transistor, a fourth switch transistor and a sixth switch transistor are all connected to a negative electrode of the direct current input bus;

a second terminal of the first switch transistor is connected to a first terminal of the second switch transistor, wherein a common terminal of the first switch transistor and the second switch transistor is connected to a first terminal of a first output inductor;

a second terminal of the third switch transistor is connected to a first terminal of the fourth switch transistor, wherein a common terminal of the third switch transistor and the fourth switch transistor is connected to a first terminal of a second output inductor;

a second terminal of the fifth switch transistor is connected to a first terminal of the sixth switch transistor, wherein a common terminal of the fifth switch transistor and the sixth switch transistor is connected to a first terminal of a third output inductor;

a second terminal of the first output inductor is connected to a first terminal of a first filter capacitor, wherein a common terminal of the first output inductor and the first filter capacitor is connected to an A phase line of a power grid;

a second terminal of the second output inductor is connected to a first terminal of a second filter capacitor, wherein a common terminal of the second output inductor and the second filter capacitor is connected to a B phase line of the power grid;

a second terminal of the third output inductor is connected to a first terminal of a third filter capacitor, wherein a common terminal of the third output inductor and the third filter capacitor is connected to a C phase line of the power grid; and second terminals of the first filter capacitor, the second filter capacitor, and the third filter capacitor are connected to the negative electrode of the direct current input bus, wherein the three-phase grid-connected inverter is controlled by performing the method for controlling a three-phase grid-connected inverter according to claim 1.

11. The method for controlling a three-phase grid-connected inverter according to claim 3, wherein the controlling the three inductor currents in a discontinuous inductor current mode comprises:

in order to control a target inductor current among the three inductor currents, controlling a target switch transistor corresponding to the target inductor current to be turned on;

acquiring a peak current corresponding to the target inductor current according to the following predetermined inductor peak current calculation expression:

$$\Delta I = \sqrt{\frac{2TI\sin\omega t \times (U_{dc} - U_x)U_x}{LU_{dc}}},$$

wherein $\Delta I$ represents a peak current, T represents an entire switching cycle in an interval, I represents an amplitude of an inductor current, $\omega$ represents an angular frequency of the inductor current, t represents time, L represents an inductance, $U_{dc}$ represents a voltage at a direct current side, and $U_x$ represents a voltage of a power grid node at an alternating current side relative to a negative electrode of a bus;

acquiring an actual current corresponding to the target inductor current, and controlling the target switch transistor to be turned off when the actual current reaches the peak current corresponding to the target inductor current; and controlling, after the target inductor current reaches zero and in the same manner, the target inductor current in a next switching cycle, to control the three inductor currents in the discontinuous inductor current mode.

12. The method for controlling a three-phase grid-connected inverter according to claim 11, wherein after the acquiring a peak current corresponding to the target inductor current and before the actual current reaches the peak current corresponding to the target inductor current, the method further comprises:

multiplying the peak current corresponding to the target inductor current by a positive coefficient $\alpha$ to obtain a product, as the peak current corresponding to the target inductor current.

13. The method for controlling a three-phase grid-connected inverter according to claim 3, wherein the controlling the three inductor currents in a discontinuous inductor current mode comprises:

in order to control a target inductor current among the three inductor currents, controlling a target switch transistor corresponding to the target inductor current to be turned on;

acquiring a target on-duration ratio corresponding to the target inductor current in an entire switching cycle according to the following predetermined on-duration ratio calculation expression:

$$D = \sqrt{\frac{2LI\sin\omega t}{TU_{dc}(U_{dc} - U_x)}} U_x,$$

and acquiring target turn-on duration corresponding to the target inductor current in the entire switching cycle based on the target on-duration ratio, wherein T represents an entire switching cycle in an interval, D represents an on-duration ratio in the entire switching cycle, I represents an amplitude of an inductor current, $\omega$ represents an angular frequency of the inductor current, t represents time, L represents an inductance, $U_{dc}$ represents a voltage at a direct current side, and $U_x$ represents a voltage of a power grid node at an alternating current side relative to a negative electrode of a bus;

controlling the target switch transistor to be turned off when actual turn-on duration of the target switch transistor matches the target turn-on duration; and controlling, after the target inductor current reaches zero and in the same manner, the target inductor current in a next switching cycle, to control the three inductor currents in the discontinuous inductor current mode.

14. The method for controlling a three-phase grid-connected inverter according to claim 13, wherein after the acquiring a target on-duration ratio corresponding to the target inductor current in an entire switching cycle and before the acquiring target turn-on duration corresponding to the target inductor current in the entire switching cycle based on the target on-duration ratio, the method further comprises:

multiplying the target on-duration ratio by a positive coefficient α to obtain a product, as the target on-duration ratio corresponding to the target inductor current in the entire switching cycle.

* * * * *